United States Patent [19]

Kostov et al.

[11] Patent Number: 4,900,097
[45] Date of Patent: Feb. 13, 1990

[54] CAR WHEEL MADE OF POLYMER MATERIAL

[75] Inventors: Georgi D. Kostov; Bogoya G. Gargov; Chavdar L. Gitchev; Sophya G. Kostova, all of Sofia, Bulgaria

[73] Assignee: Technologitchen Center "IPOMA", Sofia, Bulgaria

[21] Appl. No.: 236,059

[22] Filed: Aug. 23, 1988

[51] Int. Cl.4 ............................................... B60B 5/02
[52] U.S. Cl. ................................. 301/63 PW; 301/65; 301/6 WB
[58] Field of Search ................... 301/6 CS, 6 WB, 62, 301/63 R, 63 PW, 65, 9 DN

[56] References Cited

U.S. PATENT DOCUMENTS

| | | | |
|---|---|---|---|
| 1,516,230 | 11/1924 | Garriott | 301/63 DS |
| 1,818,447 | 8/1931 | Baker | 301/6 WB |
| 3,811,737 | 5/1974 | Lejeune | 301/64 SD |
| 4,035,028 | 7/1977 | Wilcox | 301/63 DD |

FOREIGN PATENT DOCUMENTS

| | | | |
|---|---|---|---|
| 0074118 | 3/1983 | European Pat. Off. | 301/65 |
| 2513187 | 10/1975 | Fed. Rep. of Germany | 301/63 PW |
| 3224737 | 1/1983 | Fed. Rep. of Germany . | |
| 0195403 | 11/1984 | Japan | 301/63 PW |
| 2069422 | 4/1984 | United Kingdom . | |

Primary Examiner—Russell D. Stormer
Attorney, Agent, or Firm—Klein & Vibber

[57] ABSTRACT

A car wheel made of engineering polymer material, which consists of a rim in which there is shaped a well for the tire. The wheel is connected to a disc provided with holes for the fixing components. Between the wheel disc and the car hub there is inserted a heat insulating plate. In the zone of each hole for the fixing components there is provided a plurality of axially, uniformly arranged pins made of a steel with a high limit of elasticity, the faces of which are in contact with supporting plates, disposed on both sides of the disc, and the coefficient of linear expansion of the pins is equal to that of the fixing components.

4 Claims, 2 Drawing Sheets

CAR WHEEL MADE OF POLYMER MATERIAL

BACKGROUND OF THE INVENTION

This invention relates to a car wheel made of engineering polymer materials which will find application in automative engineering.

The known car wheels, made of engineering polymer material, generally comprise a rim having shaped well for the tyre. The rim is connected to a disc in which there are provided holes for fastening the wheel to the hub of the car by means of fixing components such as threaded bolts. Generally hard material inserts are embedded in the zone of these holes.

A drawback of this known wheel lies in that, when it is subjected to loading and heating in service conditions, the polymer material in the zone of the holes for the fixing components is squeezed and deformed and, as a result, the tightening torque in the fixing components decreases.

Another known car wheel is made of engineering polymer material reinforced with glass fibers. It comprises a rim connected to a disc with holes for fastening the wheel by means of fixing components, such as threaded bolts to the hub of the car. There is generally inserted a heat insulating plate between the wheel disc and the car disc for reducing the heating of the wheel disc.

A drawback of this wheel lies in that, regardless of the presence of a heat insulating plate, there is observed a creep of the material in the zone of the holes for the fixing components, which results in a decrease of the tightening torque.

Another known car wheel made of engineering polymer material reinforced with glass fibers, comprises a rim connected to a disc, and between the disc and the hub there is inserted a heat insulating plate with radially arranged ribs and ventilating channels. Heat insulating rings are mounted underneath the fixing components, which connect the wheel disc with the car hub.

A drawback of this known car wheel resides in that, regardless of the complication of its design, it is not possible to avoid the harmful influence of the creep of the polymer engineering material in the zone of the fixing components and this results in a decrease of the tightening torque.

SUMMARY OF THE INVENTION

It is, therefore, a general object of the invention to develop a car wheel made of engineering polymer material in which the decrease of the tightening torque in the fixing components during the process of service, when the wheel is subjected to load and heating, falls within allowable limits.

This object is achieved by developing a car wheel made of engineering polymer material which consists of a rim in which there is shaped well for the tyre. The wheel is connected to a disc provided with holes for the fixing components. Between the wheel disc and the car hub there is inserted a heat insulating plate. According to the invention, there are provided axially, uniformly arranged pins made of a steel with a high limit of elasticity in the zone of each hole of a fixing component. The opposite faces of each hole are in contact with opposite supporting plates, disposed on both sides of the disc, and the coefficient of linear expansion of the pins is equal to that of the fixing components.

The advantages of the car wheel made of engineering polymer material, according to the invention, lies in that the harmful influence of material creep in the zones of the holes for the fixing components is reduced and, as a result, the initial tightening torque of the fixing components only decreases within the allowable limits during the service life of the wheel when it is subjected to repeated loading and heating. This results in an increase of the security and safety during the service of the car.

BRIEF DESCRIPTION OF THE DRAWINGS

For a better understanding of the invention, reference should be made to the accompanying drawings in which there is illustrated and described a preferred embodiment of the invention.

DESCRIPTION OF THE PREFERRED EMBODIMENT

Figure 1:
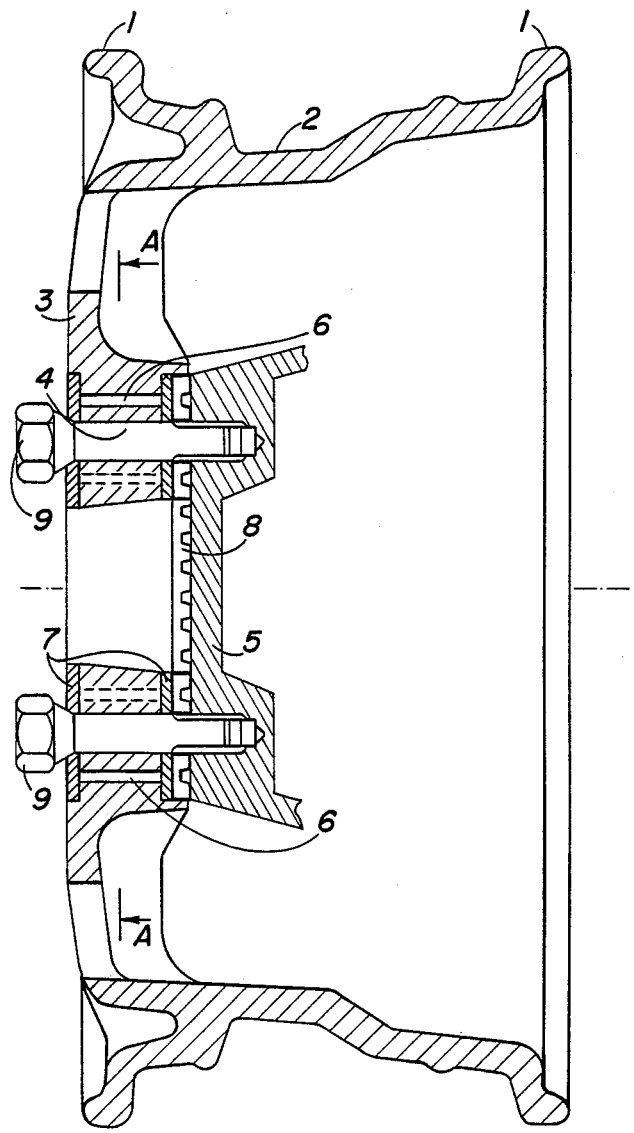
FIG. 1 is a longitudinal sectional view of the wheel mounted on the car hub.
Figure 2:
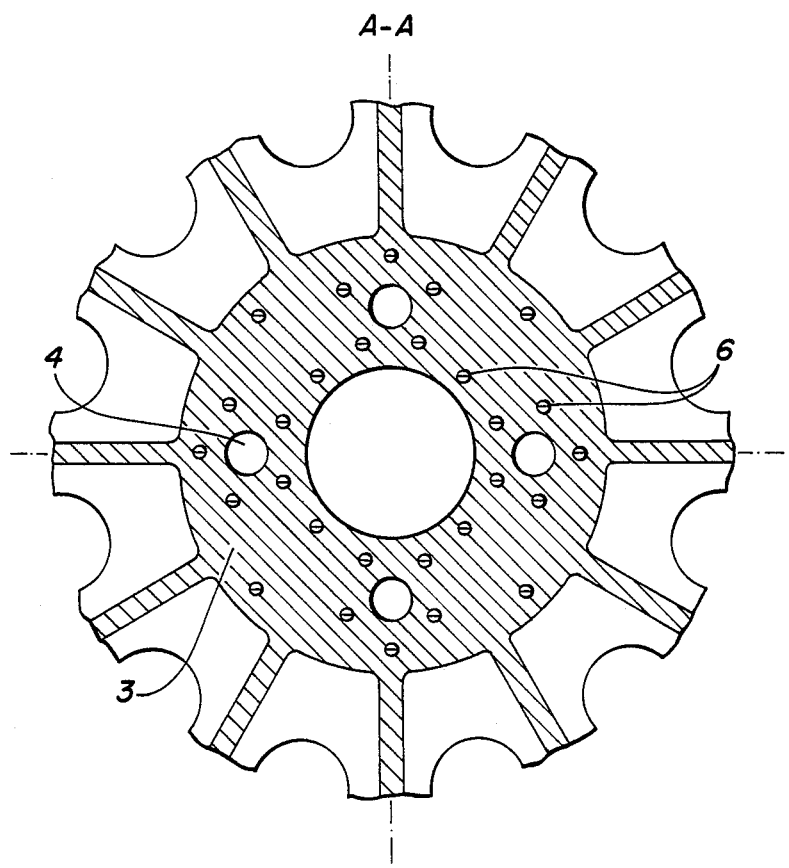
FIG. 2 is a cross-section along A—A in FIG. 1.

The car wheel according to the invention comprises a rim 1 which has a shaped well 2 for the tyre. The rim 1 is connected to a disc 3 provided with threaded holes 4 for threaded bolts 9. Between the disc 3 of the wheel and the car hub 5 there is inserted as heat insulating plate 8. Plate 8 can be made, for example, of the following material: Polyaminobismaleimide PABM reinforced with 65% glass fibers. Trade name: KINEL 5504. In the zone of each threaded hole 4 for each threaded bolt 9 there are provided axial, uniformly arranged pins 6 made of a steel with a high limit of elasticity. The steel of high limit of elasticity is a so-called "Steel 65" which according to Bulgarian State Standards 6742-82 is known as spring steel. This is a carbon-steel, having an elastic yield limit of 46 g/mm$^2$ and a tensile strength of 80 kg/mm. The chemical compositions: carbon (c): 0.62–6.70; manganese (Mn): 0.90–1.20; silicon (Si) 0.17–0.37; chromium (Cr): 0.25. A pair of supporting plates 7 are disposed on both sides of the disc 3. The faces of the pins 6 are in contact with supporting plates 7, disposed on both sides of the disc 3. The coefficient of linear expansion of the pins 6 is equal to that of the bolts 9.

During the service of the car, when the wheels are loaded and heated due to the intensive use of the braking system, the creep of the engineering polymer material (such a material may, for example, be polyamide materials of batch production reinforced with glass fibers and intended for spray casting. For example, polyamide 6.6 reinforced with glass fibers from 43% to 50%; Chemical formula:

(A) 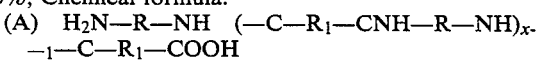

(B) Polyamide 6, reinforced with
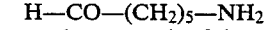

is increased, as a result of the axial pressure of the bolts 9 and this results in a decrease of the initial tightening torque. The creep is expressed in the zones of the bolts 9 and between the supporting plates 7, which are in contact with the pins 6. To avoid the harmful influence of creep of the engineering polymer material in the zones around the bolts 9 and between the supporting plates 7 disposed on both sides of the disc 3, the number of the axially arranged pins 6, in these zones as well as their diameters and material are determined in such a way, that the total deformation of the pins 6 under the action of the axial pressure of the bolts 9 should be smaller than the maximum admissible elastic deformation of the pins 6, as well as the deformation of the afore-mentioned pins should be equal to the deformation of the engineering polymer material adjacent to the pins 6. The steel pins 6 axially disposed in the zones around the holes for the bolts 9 serve for taking on a part of the axial pressure the bolt exercise on the car wheel when fastening it to the hub of the car. As a result the engineering polymer material the car wheel is made of it takes on only a part of the axial pressure of the bolts. This leads to a decrease of the creep of the polymer material (especially expressed upon heating caused by an intensive use of the brake), and to a higher degree of preserving the initial tightening torque of the bolts. To this end the number of the steel pins, their diameter and the material they are made of are determined so as to keep the deformation of each pin under the action of the axial pressure of the bolts within the admissible limits of elastic deformation of the material the pins are made of, i.e. to avoid residual deformation. Besides, the sum of deformation of the pins is equal to the deformation of the engineering polymer material in the zones around the pins.

EXAMPLE 1

A car wheel made of "polyamide 6" reinforced with 30% glass fibers, pins 6 and supporting plate 7 made of "65G steel", and heat insulating plates 8 made of polyaminobismaleimide reinforced with 65% glass fibers, is mounted in laboratory conditions on the car hub 5, and the four bolts 9 are tightened with an initial tightening torque of 90 Nm. The hub 5 with the wheel mounted to it is subjected in a static condition to artificial heating by electricity. After reaching a temperature of 250° C., it is maintained automatically at that heat and temperature during two hours at an accuracy of ±10° C. Then the heating is interrupted and the system wheel - hub 5 is left to cool down freely to 25° C. without any blowing and ventilation. This cycle is repeated 10 times.

After the termination of the first cycle, which is not included in the test, and the cooling of the hub 5, a check is made and, if necessary, the initial tightening torque in the bolts 9 is restored to its original value. This is done with the aim of mating one to the other the bolts 9, the supporting plates 7, the pins 6, the wheel disc 3 and the heat insulating plate 8.

The measured tightening torques in the bolts 9 after the termination of the tests, measured in the direction of tightening, are within the limits of from 83 to 79 Nm, whereby the initial tightening torque of the bolts 9 is decreased by 8 to 12%, which is within the allowable limits for safe service of the plastic wheels.

EXAMPLE 2

A car wheel made of "polyamide 6.6", reinforced respectively with 43 and 50% glass fibers, at the same conditions of the experiment as in Example 1, is subjected to tests.

The measured tightening torques in the bolts 9 after the termination of the tests of the wheels made of both materials, measured in the direction of tightening, are within the limits of from 85 to 83 Nm, whereby the tightening torque decreases of from 5 to 8%.

EXAMPLE 3

Two car wheels made of "polyamide 6" reinforced with 30% glass fibers, prepared for tests according to Example 1, are mounted on both front hubs of a LADA passenger test car. The four bolts 9 are tightening with an initial torque 90 Nm. Between the car hub 5 and the heat insulating plate 8 of the wheel there are attached wire thermocouples for measuring the temperature of this surface, which temperature increases as a result of the intensive use of the brakes. The car is loaded with the maximum weight of 400 kg/hr at a degree of deceleration, i.e., negative acceleration of about 6 m/s$^2$ at a atmosphere temperature of 19° C.

The maximum temperatures are stabilized after the first 18 brakings and their value is of from 185° to 190° C. After the performance of 40 brakings the car is left on a parking lot to let the heated hubs 5 cool down in a static state. After reaching a temperature of 25° C. in the hubs 5, there is measured the tightening torque in the bolts 9 of both front wheels in the direction of tightening. The tightening torque is 82 Nm on the average, i.e., its decrease is 9%.

While specific embodiments of the invention have been showing and described in detail to illustrate the application of the principle of the invention, it will be understood that the invention may be embodied otherwise reporting from such principles.

What is claimed is:

1. A car wheel made of engineering polymer material, comprising a rim which has a shaped well on which a tire is adapted to be mounted, the wheel including a disc which has a hub portion, the hub portion being provided with holes for receiving fixing components, and heat insulating plate means mounted between the disc and a car hub, wherein in the region of each hole for each fixing component there are disposed a pair of supporting plates and a plurality of pins disposed between each pair of supporting plates and made of steel having a high limit of elasticity, each pin having a pair of opposite end faces, the opposite end faces of said pins being in contact with said pair of supporting plates which are disposed on opposite sides of the hub portion, and the coefficient of linear expansion of the pins being equal to that of the fixing components.

2. A car wheel as set forth in claim 1, wherein a total five pins are uniformly and equidistantly mounted around each hole.

3. A car wheel as set forth in claim 2, including at least two additional pins equidistantly mounted in said hub portion between each pair of holes.

4. A car wheel as set forth in claim 3, wherein said polymer material is polyamide.

* * * * *